US012784254B2

(12) United States Patent

Hayakawa et al.

(10) Patent No.: US 12,784,254 B2
(45) Date of Patent: Nov. 3, 2026

(54) MAP CREATION DEVICE, MAP CREATION METHOD, AND MAP CREATION PROGRAM

(71) Applicant: AISIN CORPORATION, Aichi (JP)

(72) Inventors: Kazutaka Hayakawa, Kariya (JP); Koki Ueda, Kariya (JP); Shoji Asai, Nagakute (JP)

(73) Assignee: AISIN CORPORATION, Aichi (JP)

( * ) Notice: Subject to any disclaimer, the term of this patent is extended or adjusted under 35 U.S.C. 154(b) by 268 days.

(21) Appl. No.: 18/691,587

(22) PCT Filed: Oct. 31, 2022

(86) PCT No.: PCT/JP2022/040838
§ 371 (c)(1),
(2) Date: Mar. 13, 2024

(87) PCT Pub. No.: WO2023/074907
PCT Pub. Date: May 4, 2023

(65) Prior Publication Data
US 2024/0386598 A1 Nov. 21, 2024

(30) Foreign Application Priority Data
Oct. 29, 2021 (JP) ................................ 2021-178338

(51) Int. Cl.
*G06T 7/70* (2017.01)

(52) U.S. Cl.
CPC ..................................... *G06T 7/70* (2017.01)

(58) Field of Classification Search
CPC ................................... G06T 7/70; G06T 7/73
(Continued)

(56) References Cited

U.S. PATENT DOCUMENTS

2016/0037154 A1* 2/2016 Hung ...................... G06T 7/593
348/47
2017/0277197 A1* 9/2017 Liao .................... G05D 1/0251
(Continued)

FOREIGN PATENT DOCUMENTS

JP 2015-100065 A 5/2015

OTHER PUBLICATIONS

Michael Miksch, et al., "Homography-Based Extrinsic Self-Calibration for Cameras in Automotive Applications", Jun. 21, 2010 XP093235127, pp. 1-6, https://www.iss.uni-stuttgart.de/forschung/publikationen/miksch_wit2010.pdf.
(Continued)

*Primary Examiner* — Jennifer Mehmood
*Assistant Examiner* — Karsten Foster Lantz
(74) *Attorney, Agent, or Firm* — Sughrue Mion, PLLC

(57) ABSTRACT

A map creation device including an odometry information calculator calculating odometry information indicating an amount of movement of a vehicle; an initial value calculator calculating, from the odometry information, an initial value of a homography matrix between images obtained by an in-vehicle camera photographing different locations; and an optimal value calculator calculating, by iterative computation, an optimal value of the homography matrix from the calculated initial value and a luminance value of each pixel included in a road-surface region specified in the images. The device also includes a camera position and orientation calculator calculating an amount of change in camera position and an amount of change in camera orientation of the in-vehicle camera by resolving the optimal value; and a three-dimensional position calculator calculating three-dimensional positions of features in the images from the amount of change in camera position and in camera orientation.

8 Claims, 6 Drawing Sheets

(58) Field of Classification Search
USPC .......................................................... 382/285
See application file for complete search history.

(56) References Cited

U.S. PATENT DOCUMENTS

2021/0232151 A1* 7/2021 Liu ...................... G05D 1/0253
2023/0010175 A1* 1/2023 Kato ....................... G01S 17/42

OTHER PUBLICATIONS

Communication dated Jan. 13, 2025 issued by the European Patent Office in application No. 22887232.1.
International Search Report issued Jan. 17, 2023 in International Application No. PCT/JP2022/040838.
Lovegrove et al., "Accurate Visual Odometry from a Rear Parking Camera", 2011 IEEE Intelligent Vehicles Symposium (IV), Jun. 5-9, 2011, pp. 788-793.

* cited by examiner (A) Image obtained before movement of vehicle (B) Image obtained after movement of vehicle Image I*

MAP CREATION DEVICE, MAP CREATION METHOD, AND MAP CREATION PROGRAM

CROSS REFERENCE TO RELATED APPLICATIONS

This is a National Stage of International Application No. PCT/JP2022/040838 filed Oct. 31, 2022, claiming priority based on Japanese Patent Application No. 2021-178338 filed Oct. 29, 2021, the entire contents of which are incorporated in their entirety.

TECHNICAL FIELD

The present disclosure relates to a map creation device, a map creation method, and a map creation program.

BACKGROUND ART

Conventionally, there is a technique in which a surrounding environment is photographed with a camera mounted on a vehicle and the position and orientation of the vehicle are estimated from photographed images (e.g., Steven Lovegrove, Andrew J. Davison and Javier Ibanez-Guzman, "Accurate Visual Odometry from a Rear Parking Camera", Intelligent Vehicles Symposium, 2011; hereinafter, referred to as "Non Patent Literature 1").

According to the technique described in Non Patent Literature 1, as shown in FIG. 9, when two different locations are photographed with a camera installed at the rear of a vehicle, a plurality of images such as those shown in FIG. 10 are obtained. By extracting a road-surface region from the plurality of images and performing iterative computation based on luminance of the extracted road-surface regions, an optimal value of a homography matrix between the plurality of images is determined. For an algorithm for the iterative computation, an Efficient Second order Minimisation (ESM) algorithm is used. Then, from the optimal value of the homography matrix, the amount of change in position and the amount of change in orientation of the vehicle are calculated.

SUMMARY OF THE DISCLOSURE

Technical Problems

However, in the technique described in the above-described Non Patent Literature 1, the amount of iterative computation performed upon determining the optimal value of the homography matrix is large and thus a reduction in cost cannot be achieved. Hence, a reduction in the amount of iterative computation is sought.

The present disclosure is made in view of the above-described circumstances, and provides a map creation device, a map creation method, and a map creation program that can reduce the amount of iterative computation when calculating three-dimensional positions of features in a plurality of images obtained by photographing different locations.

Solutions to Problems

To provide the above-described map creation device, a map creation device according to a first aspect includes: an image obtaining part that obtains a plurality of images from an in-vehicle camera that is mounted on a vehicle and photographs a surrounding of the vehicle, the plurality of images being obtained by photographing different locations; an odometry information calculating part that calculates odometry information indicating an amount of movement of the vehicle; an initial value calculating part that calculates an initial value of a homography matrix between the plurality of images from the odometry information of the vehicle; an optimal value calculating part that calculates, by iterative computation, an optimal value of the homography matrix from the initial value and a luminance value of each pixel included in a road-surface region specified in the plurality of images; a camera position and orientation calculating part that calculates an amount of change in camera position and an amount of change in camera orientation of the in-vehicle camera by resolving the optimal value; and a three-dimensional position calculating part that calculates three-dimensional positions of features in the plurality of images from the amount of change in camera position and the amount of change in camera orientation.

In addition, a map creation device according to a second aspect is such that in the map creation device according to the first aspect, the camera position and orientation calculating part further calculates an estimated value of a road surface's normal vector by resolving the optimal value, the road surface's normal vector being a vector in a normal direction of a road surface viewed from the in-vehicle camera, and the map creation device further includes a use determining part that determines to use the amount of change in camera position and the amount of change in camera orientation, when an error is less than a threshold value, the error being represented by an angle between the estimated value of the road surface's normal vector and a value of a road surface's normal vector that is determined in advance by calibration of the in-vehicle camera.

In addition, a map creation device according to a third aspect is such that in the map creation device according to the second aspect, the use determining part determines not to use the amount of change in camera position and the amount of change in camera orientation, when the error is greater than or equal to the threshold value.

Furthermore, to provide the above-described map creation method, a map creation method according to a fourth aspect includes: obtaining a plurality of images from an in-vehicle camera that is mounted on a vehicle and photographs a surrounding of the vehicle, the plurality of images being obtained by photographing different locations; calculating odometry information indicating an amount of movement of the vehicle; calculating an initial value of a homography matrix between the plurality of images from the odometry information of the vehicle; calculating, by iterative computation, an optimal value of the homography matrix from the initial value and a luminance value of each pixel included in a road-surface region specified in the plurality of images; calculating an amount of change in camera position and an amount of change in camera orientation of the in-vehicle camera by resolving the optimal value: and calculating three-dimensional positions of features in the plurality of images from the amount of change in camera position and the amount of change in camera orientation.

Furthermore, to provide the above-described map creation program, a map creation program according to a fifth aspect causes a computer to: obtain a plurality of images from an in-vehicle camera that is mounted on a vehicle and photographs a surrounding of the vehicle, the plurality of images being obtained by photographing different locations; calculate odometry information indicating an amount of movement of the vehicle; calculate an initial value of a homography matrix between the plurality of images from the odometry information of the vehicle; calculate, by iterative computation, an optimal value of the homography matrix from the initial value and a luminance value of each pixel included in a road-surface region specified in the plurality of images; calculate an amount of change in camera position and an amount of change in camera orientation of the in-vehicle camera by resolving the optimal value; and calculate three-dimensional positions of features in the plurality of images from the amount of change in camera position and the amount of change in camera orientation.

Advantageous Effects of Various Aspects of the Disclosure

According to a technique of the present disclosure, there is an advantageous effect that when three-dimensional positions of features in a plurality of images obtained by photographing different locations are calculated, the amount of iterative computation can be reduced.

DESCRIPTION OF EMBODIMENTS

Figure 1:
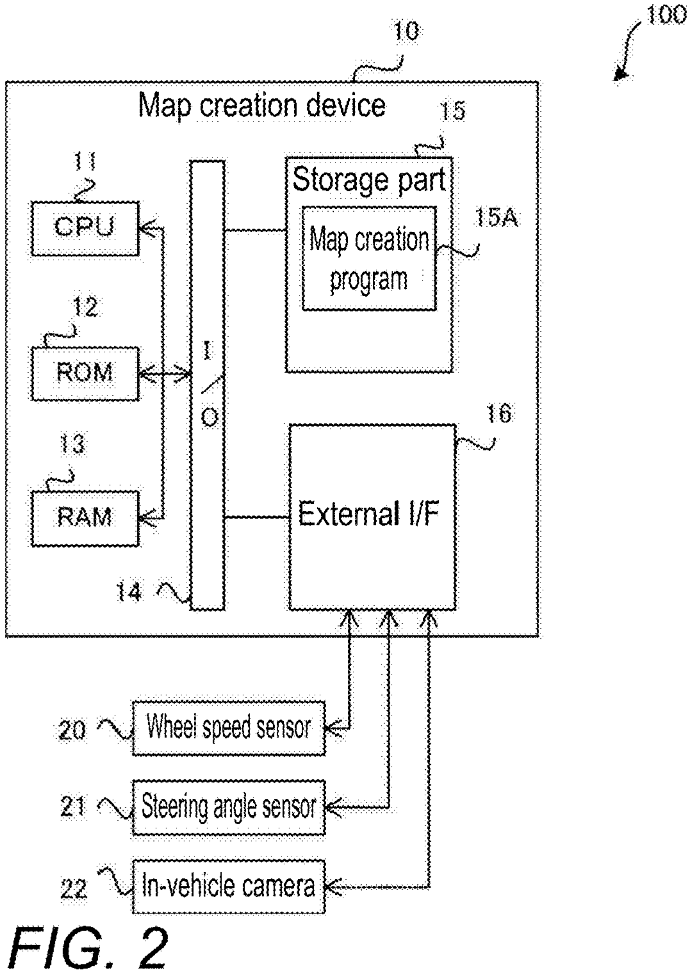
FIG. 1 is a diagram showing an example of a configuration of a map creation system according to an embodiment.

An example of a mode for carrying out a technique of the present disclosure will be described in detail below with reference to the drawings. Note that components and processes that have the same operation, action, or functions are given the same reference signs throughout all drawings, and an overlapping description thereof may be omitted as appropriate. Each drawing is merely schematically shown to the extent that the technique of the present disclosure can be adequately understood. Thus, the technique of the present disclosure is not limited only to examples shown in the drawings. In addition, in the present embodiment, a description of configurations that are not directly related to the technique of the present disclosure or well-known configurations may be omitted.

A map creation device according to the present embodiment relates to initialization of a map performed when a point cloud map is created in a framework of a Visual Simultaneous Localization and Mapping (SLAM) technique that uses an in-vehicle camera. In the initialization of a map, first, there is a need to determine the amount of change in position and the amount of change in orientation of the in-vehicle camera from images obtained by photographing two different locations. However, in a scene with a very few features that can be detected from images, it is difficult to accurately determine the amount of change in position and the amount of change in orientation of the in-vehicle camera from the features. Hence, the amount of change in position and the amount of change in orientation of the in-vehicle camera are determined from the luminance value of each pixel in a road-surface region.

FIG. 1 is a diagram showing an example of a configuration of a map creation system 100 according to the present embodiment.

As shown in FIG. 1, the map creation system 100 according to the present embodiment includes a map creation device 10, a wheel speed sensor 20, a steering angle sensor 21, and an in-vehicle camera 22.

The in-vehicle camera 22 is mounted on a vehicle and photographs surroundings of the vehicle. Where to install the in-vehicle camera 22 on the vehicle is not particularly limited as long as the in-vehicle camera 22 is installed to allow photographing of a road surface. For the in-vehicle camera 22, for example, a monocular camera is applied, but the in-vehicle camera 22 is not limited thereto and a stereo camera, etc., may be used.

Specifically, the in-vehicle camera 22 is a monocular camera provided at the top of the vehicle, etc., and photographs surrounding areas such as in front of or behind the vehicle. The in-vehicle camera 22 is, for example, provided near a substantially central portion in a vehicle width direction and disposed such that an optical axis of the in-vehicle camera 22 faces slightly downward relative to a horizontal direction. The in-vehicle camera 22 is communicably connected to the map creation device 10, and sends photographed images to the map creation device 10.

The wheel speed sensor 20 detects wheel speed of four wheels of the vehicle. The wheel speed sensor 20 sends the detected wheel speed to the map creation device 10. For the wheel speed sensor 20, normally, a wheel encoder is used, but for a vehicle including a motor such as a hybrid vehicle, a motor encoder may be used. The motor encoder has high detection accuracy compared to the wheel encoder and thus is desirable.

The steering angle sensor 21 detects a steering angle of the vehicle. The steering angle sensor 21 sends the detected steering angle to the map creation device 10.

The map creation device 10 according to the present embodiment calculates an initial value of a homography matrix between a plurality of images from odometry information of the vehicle, and calculates an optimal value of the homography matrix using the calculated initial value. By this, the amount of iterative computation can be reduced. The map creation device 10 according to the present embodiment is assumed for in-vehicle use. In a case of in-vehicle use, since the processing capabilities of resources such as a processor and a memory are relatively low, by reducing the amount of iterative computation, load on the resources decreases and thus a greater advantageous effect can be obtained.

Specifically, the map creation device 10 may be implemented as a part of an Electronic Control Unit (ECU) which is a computer for vehicle control, or may be implemented as an in-vehicle computer different from the ECU.

The map creation device 10 includes a Central Processing Unit (CPU) 11, a Read Only Memory (ROM) 12, a Random Access Memory (RAM) 13, an input/output interface (I/O) 14, a storage part 15, and an external interface (external I/F) 16.

The CPU 11, the ROM 12, the RAM 13, and the I/O 14 are connected to each other through a bus. Functional parts including the storage part 15 and the external I/F 16 are connected to the I/O 14. Each functional part can mutually communicate with the CPU 11 through the I/O 14.

The CPU 11, the ROM 12, the RAM 13, and the I/O 14 form a control part. The control part may be formed as a sub-control part that controls a part of operation of the map creation device 10, or may be formed as a part of a main control part that controls the overall operation of the map creation device 10. For some or all of blocks of the control part, for example, an integrated circuit such as Large Scale Integration (LSI) or an Integrated Circuit (IC) chipset is used. For the above-described blocks, individual circuits may be used or a partially or fully integrated circuit may be used. All blocks may be provided in a one-piece design or some blocks may be provided separately. In addition, for each block, a part of the block may be provided separately. Integration of the control part is not limited to LSI, and a dedicated circuit or a general-purpose processor may be used.

For the storage part 15, for example, a Hard Disk Drive (HDD), a Solid State Drive (SSD), a flash memory, etc., are used. The storage part 15 stores therein a map creation program 15A according to the present embodiment. Note that the map creation program 15A may be stored in the ROM 12.

The map creation program 15A may be, for example, installed in advance on the map creation device 10. The map creation program 15A may be implemented such that the map creation program 15A is stored in a non-volatile storage medium or distributed through a network, and installed on the map creation device 10 as appropriate. Note that possible examples of the non-volatile storage medium include a Compact Disc Read Only Memory (CD-ROM), a magneto-optical disk, an HDD, a Digital Versatile Disc Read Only Memory (DVD-ROM), a flash memory, and a memory card.

The external I/F 16 is an interface for communicably establishing connection with each of the wheel speed sensor 20, the steering angle sensor 21, and the in-vehicle camera 22.

Figure 2:
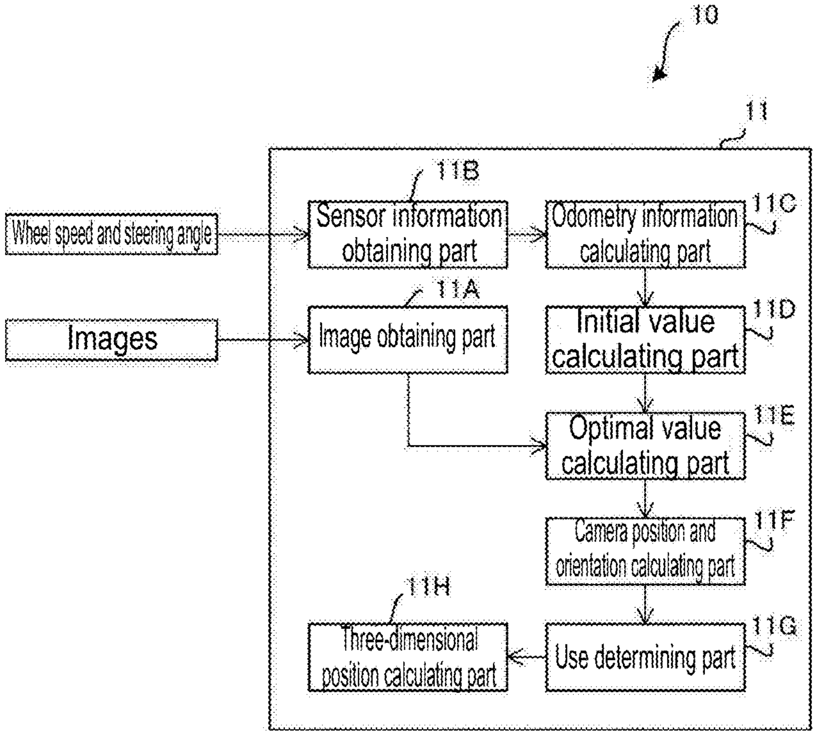
FIG. 2 is a block diagram showing an example of a functional configuration of a map creation device according to the embodiment.

The CPU 11 of the map creation device 10 according to the present embodiment functions as each part shown in FIG. 2 by writing the map creation program 15A stored in the storage part 15 into the RAM 13 and executing the map creation program 15A.

FIG. 2 is a block diagram showing an example of a functional configuration of the map creation device 10 according to the present embodiment.

As shown in FIG. 2, the CPU 11 of the map creation device 10 according to the present embodiment functions as an image obtaining part 11A, a sensor information obtaining part 11B, an odometry information calculating part 11C, an initial value calculating part 11D, an optimal value calculating part 11E, a camera position and orientation calculating part 11F, a use determining part 11G, and a three-dimensional position calculating part 11H.

The image obtaining part 11A obtains a plurality of images from the in-vehicle camera 22. The image obtaining part 11A sends the obtained plurality of images to the optimal value calculating part 11E. The plurality of images are, for example, images obtained by photographing two different locations.

The sensor information obtaining part 11B obtains wheel speed detected by the wheel speed sensor 20 and a steering angle detected by the steering angle sensor 21. The sensor information obtaining part 11B sends the obtained wheel speed and steering angle to the odometry information calculating part 11C.

The odometry information calculating part 11C calculates odometry information indicating the amount of movement of the vehicle, based on the wheel speed and steering angle sent from the sensor information obtaining part 11B. Specifically, the odometry information calculating part 11C calculates a distance traveled by the vehicle, based on the wheel speed and calculates a turning radius of the vehicle, based on the steering angle.

Figure 3:
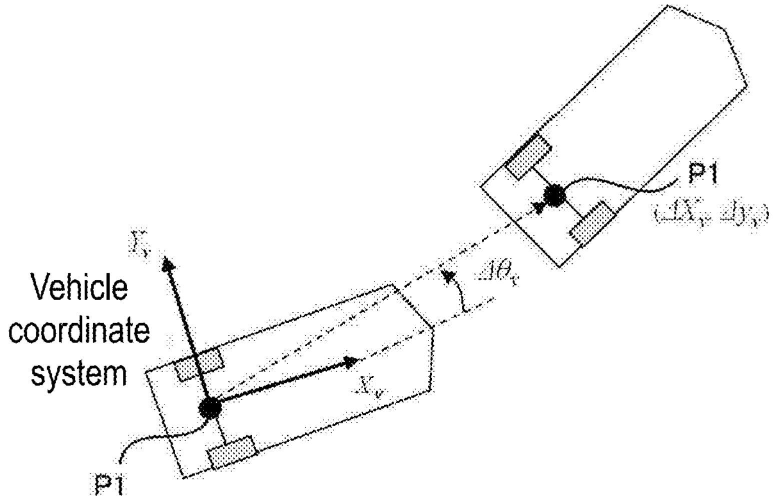
FIG. 3 is a diagram showing an example of the amount of change in position and the amount of change in yaw angle of a vehicle according to the embodiment.

FIG. 3 is a diagram showing an example of the amount of change in position and the amount of change in yaw angle of the vehicle according to the present embodiment.

As shown in FIG. 3, the odometry information calculating part 11C calculates the amount of change in position ($\Delta X_v$, $\Delta Y_v$) and the amount of change in yaw angle $\Delta\theta_v$ of the vehicle (reference point P1) in a vehicle coordinate system from a distance traveled by the vehicle and a turning radius of the vehicle. The odometry information calculating part 11C sends the calculated amount of change in position ($\Delta X_v$, $\Delta Y_v$) and amount of change in yaw angle $\Delta\theta_v$, as odometry information of the vehicle, to the initial value calculating part 11D.

The initial value calculating part 11D calculates an initial value of a homography matrix between the plurality of images, based on the odometry information of the vehicle sent from the odometry information calculating part 11C. Note that a homography refers to projection of a plane to another plane using a projective transformation. Specifically, the initial value calculating part 11D computes a translation vector $t_c$ representing a change in the position of the in-vehicle camera 22, from the amount of change in position ($\Delta X_v$, $\Delta Y_v$), and computes a rotation matrix $R_c$ representing a change in the orientation of the in-vehicle camera 22, from the amount of change in yaw angle $\Delta\theta_v$.

Figure 4:
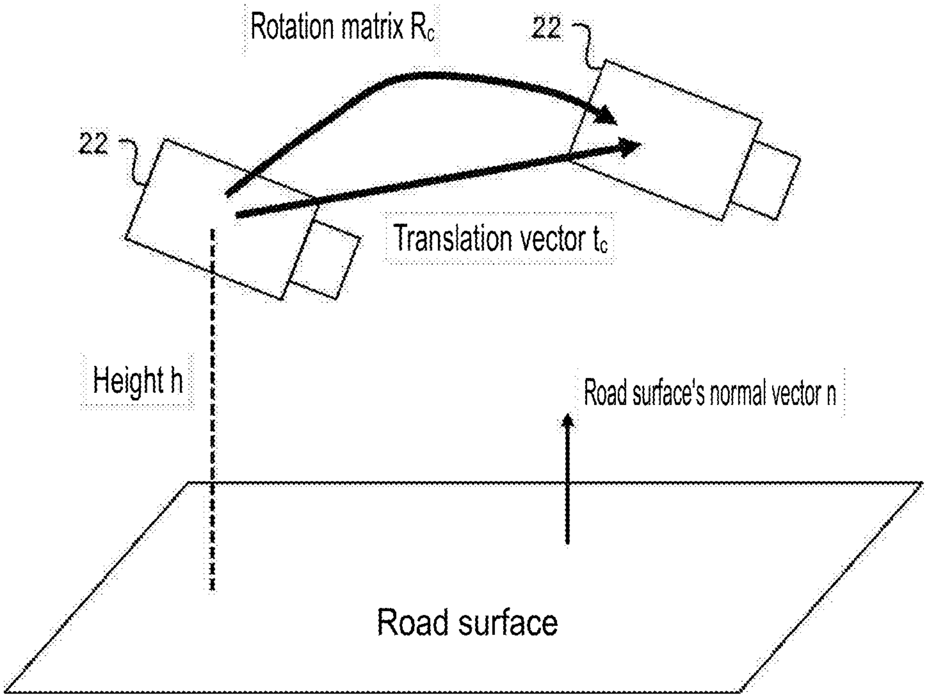
FIG. 4 is a diagram showing an example of a positional relationship between an in-vehicle camera and a road surface according to the embodiment.

FIG. 4 is a diagram showing an example of a positional relationship between the in-vehicle camera 22 and a road surface according to the present embodiment.

As shown in FIG. 4, the in-vehicle camera 22 is installed at a height h from the road surface. When the vehicle has moved from a location to another location, the above-described amount of change in position ($\Delta X_v$, $\Delta Y_v$) and amount of change in yaw angle $\Delta\theta_v$ are calculated as odometry information. Then, a translation vector $t_c$ is computed from the amount of change in position ($\Delta X_v$, $\Delta Y_v$), and a rotation matrix $R_c$ is computed from the amount of change in yaw angle $\Delta\theta_v$. A road surface's normal vector n is a vector in a normal direction of the road surface viewed from the in-vehicle camera 22, and has a magnitude of 1.

The initial value calculating part 11D calculates an initial value $G_0$ of a homography matrix using the following equation (1).

$$G_0 = K\left(R_c + t_c n^T / h\right)K^{-1} \tag{1}$$

Note that K represents an internal parameter matrix of the in-vehicle camera 22, and $R_c$ represents the rotation matrix.

$t_c$ represents the translation vector, $n^T$ represents a transposed matrix of the value n of the road surface's normal vector, and h represents the installation height of the in-vehicle camera 22 from the road surface. Note that for the internal parameter matrix K, the road surface's normal vector n, and the installation height h, values that are determined in advance by calibration of the in-vehicle camera 22 are used.

The initial value calculating part 11D sends the initial value $G_0$ calculated using the above-described equation (1) to the optimal value calculating part 11E.

The optimal value calculating part 11E calculates, by iterative computation, an optimal value of the homography matrix from the initial value sent from the initial value calculating part 11D and the luminance value of each pixel included in a road-surface region specified in the plurality of images sent from the image obtaining part 11A. Specifically, as an example, as shown in FIGS. 5A and 5B, a road-surface region is specified in an image, and an optimal value $G_{OPT}$ of a homography matrix is calculated using an ESM algorithm which is an example of iterative computation.

Figure 5A:
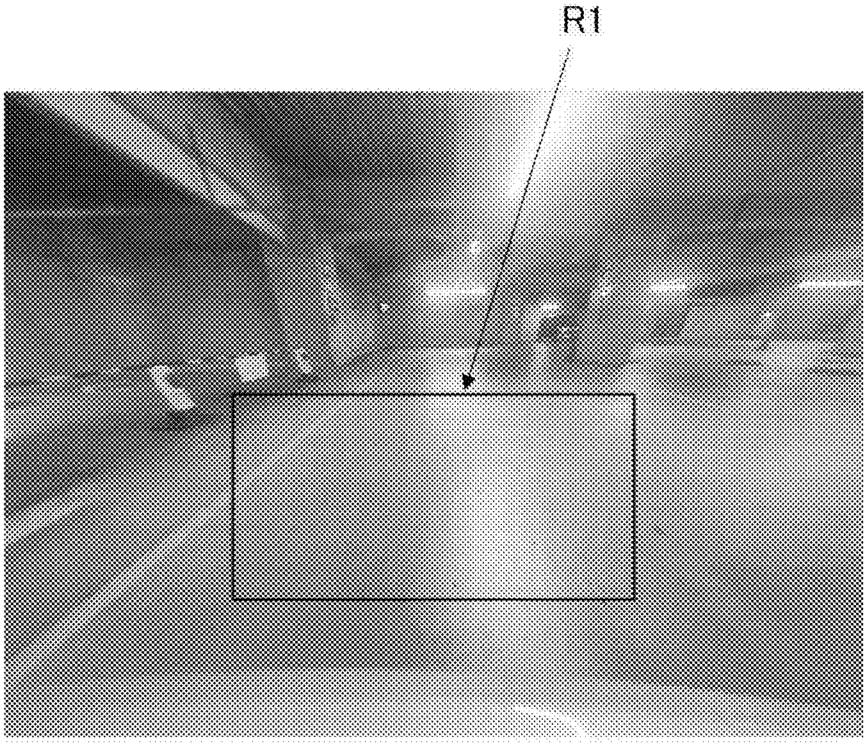
FIG. 5A is a diagram showing an example of a corresponding road-surface region between a plurality of images and showing an image obtained before movement of the vehicle, according to the embodiment.
Figure 5B:
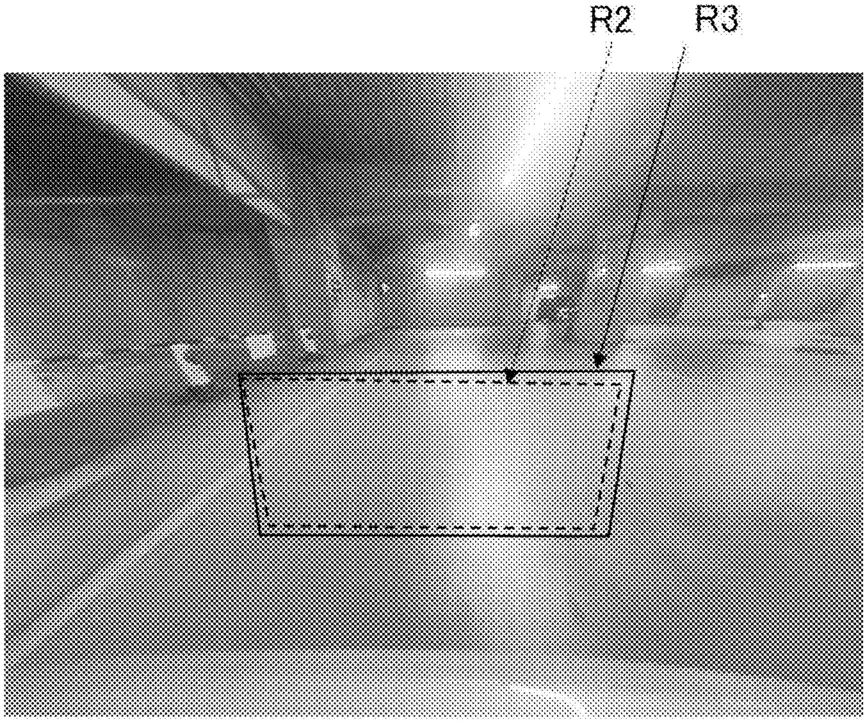
FIG. 5B is a diagram showing an example of a corresponding road-surface region between the plurality of images and showing an image obtained after movement of the vehicle, according to the embodiment.

FIGS. 5A and 5B are diagrams showing an example of corresponding road-surface regions between a plurality of images according to the present embodiment. FIG. 5A shows an image obtained before movement of the vehicle and FIG. 5B shows an image obtained after movement of the vehicle.

In the image obtained before movement of the vehicle shown in FIG. 5A, a road-surface region R1 is specified. The image obtained after movement of the vehicle shown in FIG. 5B includes a road-surface region R2 computed using the initial value $G_0$ of the homography matrix and a road-surface region R3 computed using the optimal value $G_{OPT}$ of the homography matrix.

According to the example of FIGS. 5A and 5B, an initial value $G_0$ of a homography matrix between images for two locations is calculated from odometry information of the vehicle, and an optimal value $G_{OPT}$ of the homography matrix is calculated using the calculated initial value $G_0$. That is, by calculating the initial value $G_0$ of the homography matrix from the odometry information of the vehicle, the initial value $G_0$ is set to a value close to the optimal value $G_{OPT}$, compared to a case of not using the odometry information. Hence, the number of iterations of iterative computation can be reduced. A specific method of calculating the optimal value $G_{OPT}$ of the homography matrix will be described later.

The camera position and orientation calculating part 11F calculates the amount of change in camera position and the amount of change in camera orientation of the in-vehicle camera 22 by resolving the optimal value sent from the optimal value calculating part 11E. The amount of change in camera position is represented as an estimated value $t_{est}$ of the translation vector, and the amount of change in camera orientation is represented as an estimated value $R_{est}$ of the rotation matrix. In addition, the camera position and orientation calculating part 11F calculates an estimated value of the road surface's normal vector by resolving the optimal value sent from the optimal value calculating part 11E. Specifically, the optimal value $G_{OPT}$ is resolved as shown in the following equation (2).

$$G_{OPT} = K\left(R_{est} + t_{est}n_{est}^T/h\right)K^{-1} \tag{2}$$

Note that K represents the internal parameter matrix of the in-vehicle camera 22, and $R_{est}$ represents the rotation matrix (estimated value) representing the amount of change in camera orientation. $t_{est}$ represents the translation vector (estimated value) representing the amount of change in camera position, $$n_{est}^T$$

represents the transposed matrix of the estimated value $n_{est}$ of the road surface's normal vector, and h represents the installation height of the in-vehicle camera 22 from the road surface.

The use determining part 11G determines to use the amount of change in camera position and the amount of change in camera orientation in a subsequent process (i.e., a process of calculating three-dimensional positions), when an error which is represented by an angle between the estimated value $n_{est}$ of the road surface's normal vector and a value n of a road surface's normal vector which is determined in advance by calibration of the in-vehicle camera 22 is less than a threshold value. On the other hand, when the error is greater than or equal to the threshold value, the use determining part 11G determines not to use the amount of change in camera position and the amount of change in camera orientation in the subsequent process. When the amount of change in camera position and the amount of change in camera orientation are not used, an optimal value of a homography matrix is determined again from a different set of images obtained by photographing two different locations. The threshold value can be set to an appropriate value in a range greater than 0 degrees and less than or equal to 5 degrees. Note that the use determining part 11G is not essential and a configuration that does not include the use determining part 11G may be adopted. In this case, the amount of change in camera position and the amount of change in camera orientation that are calculated by the camera position and orientation calculating part 11F are used as they are in the subsequent process.

The three-dimensional position calculating part 11H calculates three-dimensional positions of features in the plurality of images from the amount of change in camera position and the amount of change in camera orientation, when the use determining part 11G determines to use the amount of change in camera position and the amount of change in camera orientation. Specifically, the three-dimensional position calculating part 11H computes, using the principle of triangulation, three-dimensional positions of corresponding features between the images of two different locations from the positions of the features, the amount of change in camera position, and the amount of change in camera orientation.

Next, with reference to FIG. 6, action of the map creation device 10 according to the present embodiment will be described.

Figure 6:
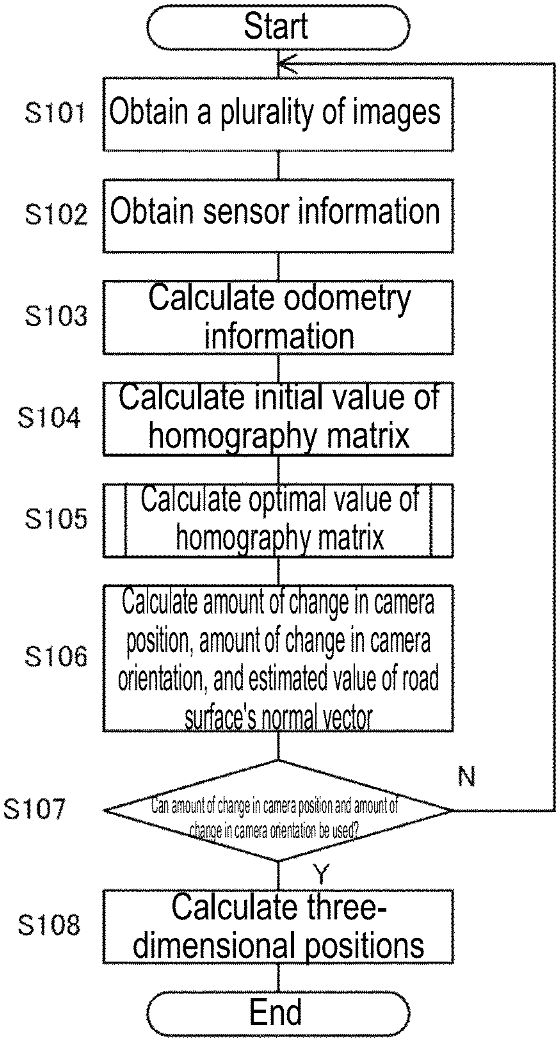
FIG. 6 is a flowchart showing an example of the flow of a process performed by a map creation program according to the embodiment.

FIG. 6 is a flowchart showing an example of the flow of a process performed by the map creation program 15A according to the present embodiment.

First, when the map creation device 10 accepts an instruction to start a map creation process, the CPU 11 starts the map creation program 15A, thereby performing the following steps.

At step S101 of FIG. 6, as an example, as shown in the above-described FIGS. 5A and 5B, the CPU 11 obtains, from the in-vehicle camera 22, a plurality of images obtained by photographing two different locations.

At step S102, the CPU 11 obtains, as sensor information, each of wheel speed from the wheel speed sensor 20 and a steering angle from the steering angle sensor 21.

At step S103, as an example, as shown in the above-described FIG. 3, the CPU 11 calculates odometry information indicating the amount of movement of the vehicle, based on the wheel speed and steering angle obtained at step S102. Specifically, the CPU 11 calculates a distance traveled by the vehicle, based on the wheel speed and calculates a turning radius of the vehicle, based on the steering angle. Then, the amount of change in position ($\Delta X_v$, $\Delta Y_v$) and the amount of change in yaw angle $\Delta\theta_v$ of the vehicle (reference point P1) in the vehicle coordinate system are calculated from the distance traveled by the vehicle and the turning radius of the vehicle.

At step S104, the CPU 11 calculates an initial value of a homography matrix between the plurality of images, based on the odometry information of the vehicle calculated at step S103. Specifically, as an example, as shown in the above-described FIG. 4, the CPU 11 calculates a translation vector $t_c$ representing a change in the position of the in-vehicle camera 22 from the amount of change in position ($\Delta X_v$, $\Delta Y_v$), calculates a rotation matrix $R_c$ representing a change in the orientation of the in-vehicle camera 22 from the amount of change in yaw angle $\Delta\theta_v$, and calculates an initial value $G_0$ of the homography matrix using the above-described equation (1).

At step S105, as an example, as shown in the above-described FIGS. 5A and 5B, the CPU 11 calculates, by iterative computation, an optimal value of the homography matrix from the initial value calculated at step S104 and the luminance value of each pixel included in a road-surface region specified in the plurality of images obtained at step S101. Here, with reference to FIGS. 7 and 8, a homography matrix's optimal value calculation process at step S105 will be specifically described.

Figure 7:
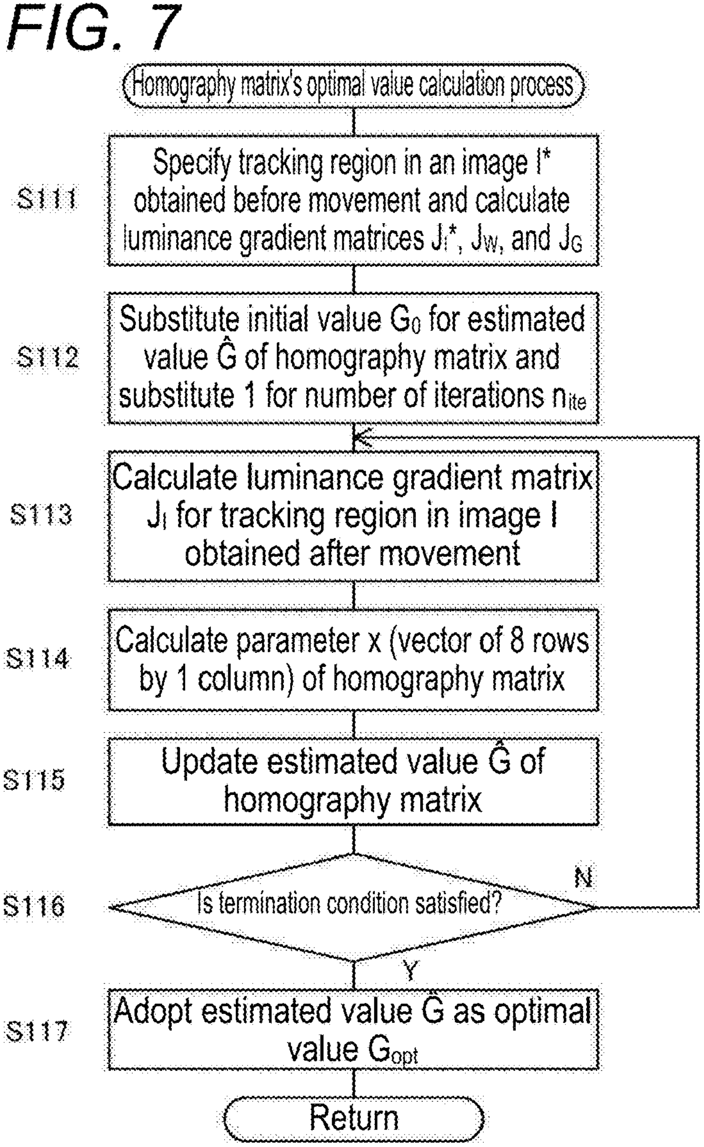
FIG. 7 is a flowchart showing an example of the flow of a homography matrix's optimal value calculation process according to the embodiment.

FIG. 7 is a flowchart showing an example of the flow of the homography matrix's optimal value calculation process according to the present embodiment, and shows a subroutine of step S105 of FIG. 6. In addition, FIG. 8 is a diagram showing an example of an image I* obtained before movement and a tracking region.

Figure 8:
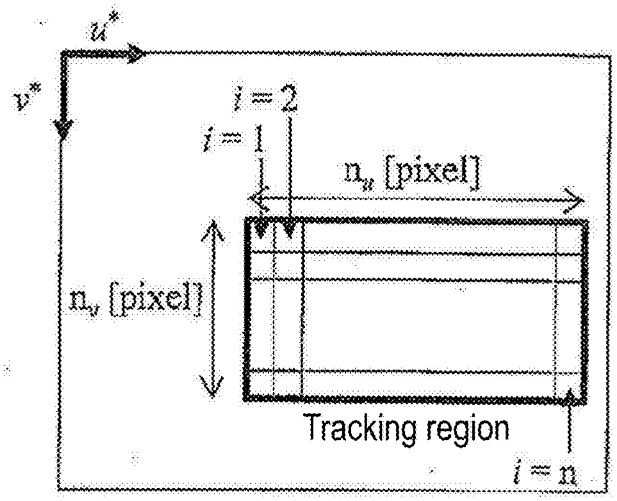
FIG. 8 is a diagram showing an example of an image obtained before movement and a tracking region.
Figure 9:
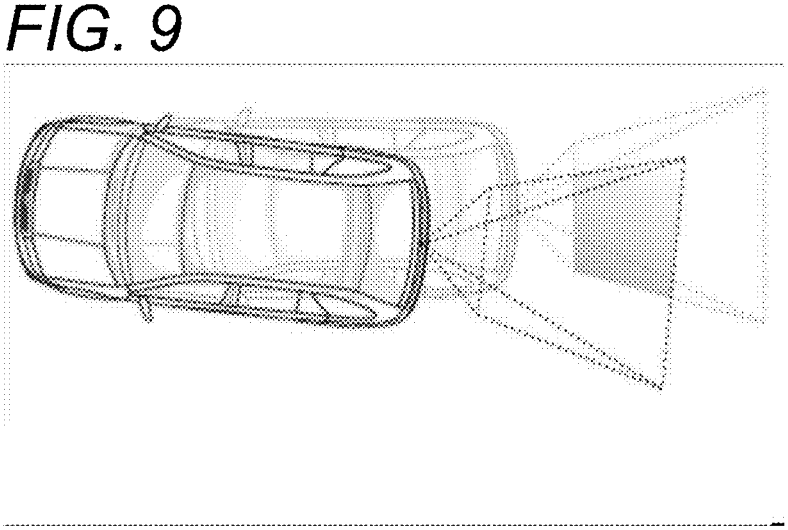
FIG. 9 is a diagram provided to describe conventional art.
Figure 10:
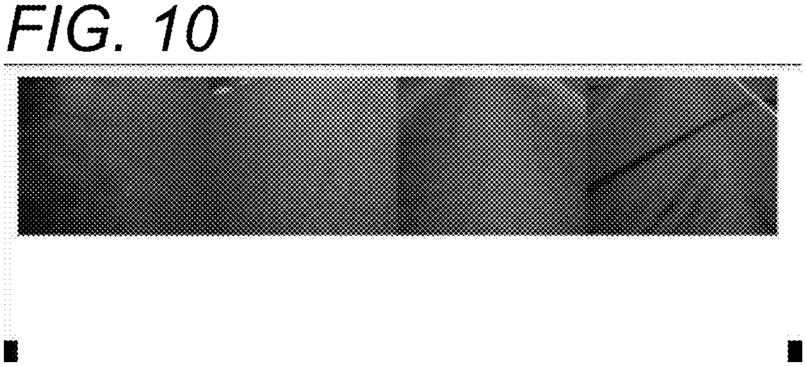
FIG. 10 is a diagram provided to describe the conventional art.

At step S111 of FIG. 7, as an example, as shown in FIG. 8, the CPU 11 specifies a tracking region (the same meaning as a road-surface region) in the image I* obtained before movement, and computes a luminance gradient matrix $J_{I*}$ and Jacobian matrices $J_W$ and $J_G$.

Specifically, as shown in FIG. 8, the number of pixels in the tracking region is $n(=n_u \times n_v)$. The luminance gradient matrix $J_{I*}$ is computed from the luminance (the values of 0 to 255) of each pixel in the tracking region in the image I* obtained before movement, using the following equation.

$$J_{I^*} = \begin{bmatrix} J_{I^*1} \\ J_{I^*2} \\ \vdots \\ J_{I^*n} \end{bmatrix}$$

Note that $$J_{I^*i} = [\,J_{I^*ui} \;\; J_{I^*vi} \;\; 0\,]\,(i = 1 \sim n)$$

$J_{I*ui}$ represents the luminance gradient in a horizontal direction of an ith pixel, and $J_{I*vi}$ represents the luminance gradient in a vertical direction of the ith pixel.

The Jacobian matrix $J_w$ is computed from the coordinates of each pixel in the tracking region in the image I* obtained before movement, using the following equation.

$$J_w = \begin{bmatrix} J_{w1} \\ J_{w2} \\ \vdots \\ J_{wn} \end{bmatrix}$$

Note that the coordinates of each pixel in the tracking region are represented by $$p_i^* = [\,u_i^* \;\; v_i^* \;\; 0\,]^T$$

In this case, $$J_{wi} = \begin{bmatrix} p_i^* & 0 & -u_i^* p_i^* \\ 0 & p_i^* & -v_i^* p_i^* \\ 0 & 0 & 0 \end{bmatrix}$$

The Jacobian matrix $J_G$ is computed from a basis $A_i$ (i=1 to 8) of a Lie algebra, using the following equation.

$$J_G = [\,[A_1]_V \;\; [A_2]_V \;\; \ldots \;\; [A_8]_V\,]$$

In the equation, $[A_i]_v$ is a vector of 9 rows by 1 column rearranged row by row.

$$A_1 = \begin{bmatrix} 0 & 0 & 1 \\ 0 & 0 & 0 \\ 0 & 0 & 0 \end{bmatrix} \quad A_2 = \begin{bmatrix} 0 & 0 & 0 \\ 0 & 0 & 1 \\ 0 & 0 & 0 \end{bmatrix} \quad A_3 = \begin{bmatrix} 0 & 1 & 0 \\ 0 & 0 & 0 \\ 0 & 0 & 0 \end{bmatrix} \quad A_4 = \begin{bmatrix} 0 & 0 & 0 \\ 1 & 0 & 0 \\ 0 & 0 & 0 \end{bmatrix}$$

$$A_5 = \begin{bmatrix} 1 & 0 & 0 \\ 0 & -1 & 0 \\ 0 & 0 & 0 \end{bmatrix} \quad A_6 = \begin{bmatrix} 0 & 0 & 0 \\ 0 & -1 & 0 \\ 0 & 0 & 1 \end{bmatrix} \quad A_7 = \begin{bmatrix} 0 & 0 & 0 \\ 0 & 0 & 0 \\ 1 & 0 & 0 \end{bmatrix} \quad A_8 = \begin{bmatrix} 0 & 0 & 0 \\ 0 & 0 & 0 \\ 0 & 1 & 0 \end{bmatrix}$$

At step S112, the CPU 11 substitutes the initial value $G_0$ for an estimated value G^ (^ is above G; hereinafter, the same) of the homography matrix, and substitutes 1 for the number of iterations $n_{ite}$.

At step S113, the CPU 11 calculates a luminance gradient matrix $J_I$ for a tracking region in an image I obtained after movement.

Specifically, coordinates in the image I obtained after movement are computed using the following equation.

$$\begin{bmatrix} u_i' \\ v_i' \\ w \end{bmatrix} = \hat{G} p_i^*,\; u_i = \frac{u_i'}{w},\; v_i = \frac{v_i'}{w}$$

Note that the coordinates in the image I obtained after movement are represented by $$p_i = [\,u_i \;\; v_i \;\; 0\,]^T\;(i = 1 \sim n)$$

The luminance gradient matrix $J_I$ is computed from the luminance of each pixel in the tracking region in the image I obtained after movement, using the following equation.

$$J_I = \begin{bmatrix} J_{I1} \\ J_{I2} \\ \vdots \\ J_{In} \end{bmatrix}$$

Note that $$J_{Ii} = [\, J_{Iui} \;\; J_{Ivi} \;\; 0 \,] \;\; (i = 1 \sim n)$$

$J_{Iui}$ represents the luminance gradient in a horizontal direction of an ith pixel, and $J_{Ivi}$ represents the luminance gradient in a vertical direction of the ith pixel.

At step S114, the CPU 11 calculates a parameter x (a vector of 8 rows by 1 column) of the homography matrix. Specifically, the parameter x is computed using the following equation.

$$x = -J_{esm}^{+} y$$

In the equation, $J_{esm}$ is a Jacobian matrix and is computed using the following equation.

$$J_{esm} = \frac{1}{2}(J_I + J_{I^*})\, J_w\, J_G$$

On the other hand, y is a luminance difference vector and is represented by the following equation.

$$y = [\, y_1 \;\; y_2 \;\; \ldots \;\; y_n \,]^T$$

In the equation, yi is computed from the luminance $I_i$ of the ith pixel obtained after movement and the luminance $I_i$* of the ith pixel obtained before movement, using the following equation.

$$y_i = I_i - I_i^*$$

At step S115, the CPU 11 updates the estimated value G^ of the homography matrix, using the following equation.

$$A(x) = \sum_{i=1}^{8} x_i A_i$$

$$G = \exp(A(x))$$

The above-described G is used as a new G^.

At step S116, the CPU 11 determines whether or not a termination condition is satisfied, i.e., whether or not iteration is required. If it is determined that the termination condition is satisfied, i.e., iteration is not required (in a case of an affirmative determination), then the CPU 11 transitions to step S117. If it is determined that the termination condition is not satisfied, i.e., iteration is required (in a case of a negative determination), then the CPU 11 returns to step S113 and repeats processing.

Specifically, when the root mean square of a luminance difference obtained this time is $y_{curr}$, $y_{curr}$ is represented by the following equation.

$$y_{curr} = \sqrt{\frac{1}{n}\sum_{i=1}^{n} y_i^2}$$

The maximum number of iterations is $n_{max}$ (e.g., 100) and a threshold value for convergence determination is ε (e.g., $10^{-5}$).

In a case of $n_{ite}=1$, the root mean square $y_{curr}$ of the luminance difference obtained this time is substituted for the root mean square $y_{prev}$ of a luminance difference obtained last time, and 1 is added to the number of iterations $n_{ite}$, and processing returns to step S113.

In a case of $1<n_{ite}<n_{max}$, if $y_{prev}-y_{curr}>\varepsilon$, then it is determined that it is not converged, and thus, the root mean square $y_{curr}$ of the luminance difference obtained this time is substituted for the root mean square $y_{prev}$ of the luminance difference obtained last time, and 1 is added to the number of iterations $n_{ite}$, and processing returns to step S113. On the other hand, if $y_{prev}-y_{curr}\leq\varepsilon$, then it is determined that it is converged, and thus, processing transitions to step S117.

In a case of $n_{ite}=n_{max}$, processing transitions to step S117.

At step S117, the CPU 11 adopts the estimated value G^ of the homography matrix as an optimal value $G_{OPT}$, and returns to step S106 of FIG. 6.

Referring back to FIG. 6, at step S106, as an example, using the above-described equation (2), the CPU 11 resolves the optimal value $G_{OPT}$ calculated at step S105, thereby calculating the amount of change in camera position, the amount of change in camera orientation, and an estimated value of a road surface's normal vector.

At step S107, the CPU 11 determines whether or not the amount of change in camera position and the amount of change in camera orientation can be used. If it is determined that the amount of change in camera position and the amount of change in camera orientation can be used (in a case of an affirmative determination), then the CPU 11 transitions to step S108. If it is determined that the amount of change in camera position and the amount of change in camera orientation cannot be used (in a case of a negative determination), then the CPU 11 returns to step S101 and repeats processing. Specifically, when an error which is represented by an angle between the estimated value $n_{est}$ of the road surface's normal vector and a value n of a road surface's normal vector which is determined in advance by calibration of the in-vehicle camera 22 is less than a threshold value, the CPU 11 determines to use the amount of change in camera position and the amount of change in camera orientation in a subsequent process. On the other hand, when the error is greater than or equal to the threshold value, the CPU 11 determines not to use the amount of change in camera position and the amount of change in camera orientation in the subsequent process. When the amount of change in camera position and the amount of change in camera orientation are not used, an optimal value of a homography matrix is determined again from a different set of images obtained by photographing two different locations.

At step S108, the CPU 11 calculates three-dimensional positions of features in the plurality of images from the amount of change in camera position and the amount of change in camera orientation, and terminates a series of processes performed by the map creation program 15A. Specifically, the CPU 11 computes, using the principle of triangulation, three-dimensional positions of corresponding features between the images of two different locations from the positions of the features, the amount of change in camera position, and the amount of change in camera orientation.

Thus, according to the present embodiment, by calculating an initial value of a homography matrix from odometry information of the vehicle, iterative computation can be started with a value close to an optimal value of the homography matrix. Hence, the number of iterations of iterative computation is reduced.

In addition, when the texture (pattern) of a road surface is poor, an error in a homography matrix increases, and thus, an error in a normal line to the road surface determined from the homography matrix may also increase. The error in the normal line to the road surface is determined by comparison with a normal line to the road surface determined from camera installation orientation. When the error in the normal line to the road surface is large, it is determined that the determined amount of change in camera position and amount of change in camera orientation cannot be used, and a homography matrix can be determined again from a different set of images obtained by photographing two locations.

Note that, in the above-described embodiments, the processor indicates a processor in a broad sense and includes general-purpose processors (e.g., a CPU: Central Processing Unit) and dedicated processors (e.g., a GPU: Graphics Processing Unit, an ASIC: Application Specific Integrated Circuit, an FPGA: Field Programmable Gate Array, and a programmable logic device).

In addition, the operation of a processor in the above-described embodiments may not only be performed by one processor but also by a plurality of processors present at physically distant locations in a cooperative manner. In addition, the order in which various types of operation of the processor are performed is not limited to the one described in the above-described embodiments and may be changed as appropriate.

A map creation device according to the embodiment is exemplified and described above. The embodiment may be in the form of programs for causing a computer to perform a function of each part included in the map creation device. The embodiment may be in the form of a non-transient storage medium that can be read by a computer having the programs stored therein.

In addition to the above, the configuration of the map creation device described in the above-described embodiment is an example and may be changed according to the situation, without departing from the true spirit.

In addition, the flow of a process performed by the program which is described in the above-described embodiment is also an example, and an unnecessary step may be deleted or a new step may be added or the processing order may be changed without departing from the true spirit.

In addition, although the above-described embodiment describes a case in which by executing the program, processes according to the embodiment are implemented by a software configuration using a computer, the embodiment is not limited thereto. The embodiment may be implemented, for example, by a hardware configuration or a combination of a hardware configuration and a software configuration.

The disclosure of Japanese Patent Application No. 2021-178338 filed Oct. 29, 2021 is incorporated herein by reference in its entirety. All literatures, patent applications, and technical standards described herein are incorporated herein by reference to the same extent as if each individual literature, patent application, or technical standard was specifically and individually indicated to be incorporated by reference.

The invention claimed is:

1. A map creation device comprising:

an image obtaining part that obtains a plurality of images from an in-vehicle camera that is mounted on a vehicle and photographs a surrounding of the vehicle, the plurality of images being obtained by photographing different locations;

an odometry information calculating part that calculates odometry information indicating an amount of movement of the vehicle;

an initial value calculating part that calculates an initial value of a homography matrix between the plurality of images from the odometry information of the vehicle;

an optimal value calculating part that calculates, by iterative computation, an optimal value of the homography matrix from the initial value and a luminance value of each pixel included in a road-surface region specified in the plurality of images;

a camera position and orientation calculating part that calculates an amount of change in camera position and an amount of change in camera orientation of the in-vehicle camera by resolving the optimal value; and a three-dimensional position calculating part that calculates three-dimensional positions of features in the plurality of images from the amount of change in camera position and the amount of change in camera orientation.

2. The map creation device according to claim 1, wherein the camera position and orientation calculating part further calculates an estimated value of a road surface's normal vector by resolving the optimal value, the road surface's normal vector being a vector in a normal direction of a road surface viewed from the in-vehicle camera, and the map creation device further comprises a use determining part that determines to use the amount of change in camera position and the amount of change in camera orientation, when an error is less than a threshold value, the error being represented by an angle between the estimated value of the road surface's normal vector and a value of a road surface's normal vector that is determined in advance by calibration of the in-vehicle camera.

3. The map creation device according to claim 2, wherein the use determining part determines not to use the amount of change in camera position and the amount of change in camera orientation, when the error is greater than or equal to the threshold value.

4. The map creation device according to claim 1, wherein the initial value calculating part calculates the initial value of the homography matric between the plurality of images using a translation vector and a rotation matrix computed from the odometry information of the vehicle together with a road surface's normal vector and an installation height of the in-vehicle camera that are determined in advance by calibration of the in-vehicle camera.

5. A map creation method comprising:

obtaining a plurality of images from an in-vehicle camera that is mounted on a vehicle and photographs a surrounding of the vehicle, the plurality of images being obtained by photographing different locations;

calculating odometry information indicating an amount of movement of the vehicle;

calculating an initial value of a homography matrix between the plurality of images from the odometry information of the vehicle;

calculating, by iterative computation, an optimal value of the homography matrix from the initial value and a luminance value of each pixel included in a road-surface region specified in the plurality of images;

calculating an amount of change in camera position and an amount of change in camera orientation of the in-vehicle camera by resolving the optimal value; and calculating three-dimensional positions of features in the plurality of images from the amount of change in camera position and the amount of change in camera orientation.

6. The map creation method according to claim 5, wherein the calculating the initial value of the homography matric between the plurality of images of the vehicle is calculated using a translation vector and a rotation matrix computed from the odometry information of the vehicle together with a road surface's normal vector and an installation height of the in-vehicle camera that are determined in advance by calibration of the in-vehicle camera.

7. A map creation program stored on a non-transitory computer readable medium, the map creation program configured to cause a computer to:

obtain a plurality of images from an in-vehicle camera that is mounted on a vehicle and photographs a surrounding of the vehicle, the plurality of images being obtained by photographing different locations;

calculate odometry information indicating an amount of movement of the vehicle;

calculate an initial value of a homography matrix between the plurality of images from the odometry information of the vehicle;

calculate, by iterative computation, an optimal value of the homography matrix from the initial value and a luminance value of each pixel included in a road-surface region specified in the plurality of images;

calculate an amount of change in camera position and an amount of change in camera orientation of the in-vehicle camera by resolving the optimal value; and calculate three-dimensional positions of features in the plurality of images from the amount of change in camera position and the amount of change in camera orientation.

8. The map creation program according to claim 7, wherein the initial value of the homography matrix between the plurality of images is calculate using a translation vector and a rotation matrix computed from the odometry information of the vehicle together with a road surface's normal vector and an installation height of the in-vehicle camera that are determined in advance by calibration of the in-vehicle camera.

* * * * *